United States Patent [19]

van de Wetering et al.

[11] 4,375,265
[45] Mar. 1, 1983

[54] ONE PIECE MOLDED PALLET-CONTAINER

[76] Inventors: Gerrit van de Wetering, Leavenworth; Jack J. Isler, East Wenatchee, both of Wash.

[21] Appl. No.: 927,157

[22] Filed: Jul. 21, 1978

[51] Int. Cl.³ .............................................. B65D 7/00
[52] U.S. Cl. .................................... 220/1.5; 220/4 F; 206/508; 206/511
[58] Field of Search ...................... 220/15, 4 F, 70, 72, 220/74, 83, 306; 206/511, 505, 519, 508, 506

[56] References Cited

U.S. PATENT DOCUMENTS

| | | | |
|---|---|---|---|
| 3,349,939 | 10/1967 | Averill | 206/511 X |
| 3,556,338 | 1/1971 | Wilkinson et al. | 220/306 |
| 3,964,636 | 6/1976 | Rehrig | 220/83 |
| 3,985,258 | 10/1976 | Quigley et al. | 220/4 F |
| 3,998,327 | 12/1976 | Box | 206/508 |
| 4,000,827 | 1/1977 | Emery | 220/4 F |
| 4,020,967 | 5/1977 | Hammond et al. | 220/1.5 X |

*Primary Examiner*—Steven M. Pollard
*Attorney, Agent, or Firm*—Ralph R. Roberts

[57] ABSTRACT

This invention pertains to a one-piece molded pallet-container made of a foamed plastic. In a preferred embodiment the pallet provides a stacking capability with a series of like pallet-containers. The container may have its base formed with entrances on all four sides for the placing and positioning of the forks of a fork lift truck. The base or bottom of this molded pallet-container has reinforcing ribs extending downwardly particularly at and forming the support portion for the forks of the lift truck. The exterior of the walls of this pallet-container are formed with ribs providing side wall strength to the container for a full load of fluid or similar material exerting a side thrust on the walls. In a like manner, the ribs on the bottom also provide strength and rigidity to the bottom member. The bottom support surface and the outwardly extending portion of the bottom are adapted for placing on and transport by a roller conveyor. In a variation of the contemplated four-way pallet-container, a two-way entry for a fork lift truck is provided.

1 Claim, 25 Drawing Figures

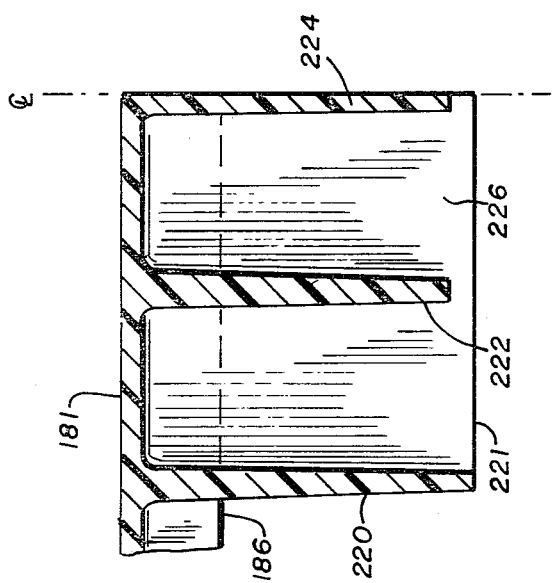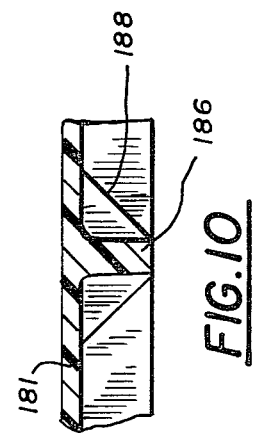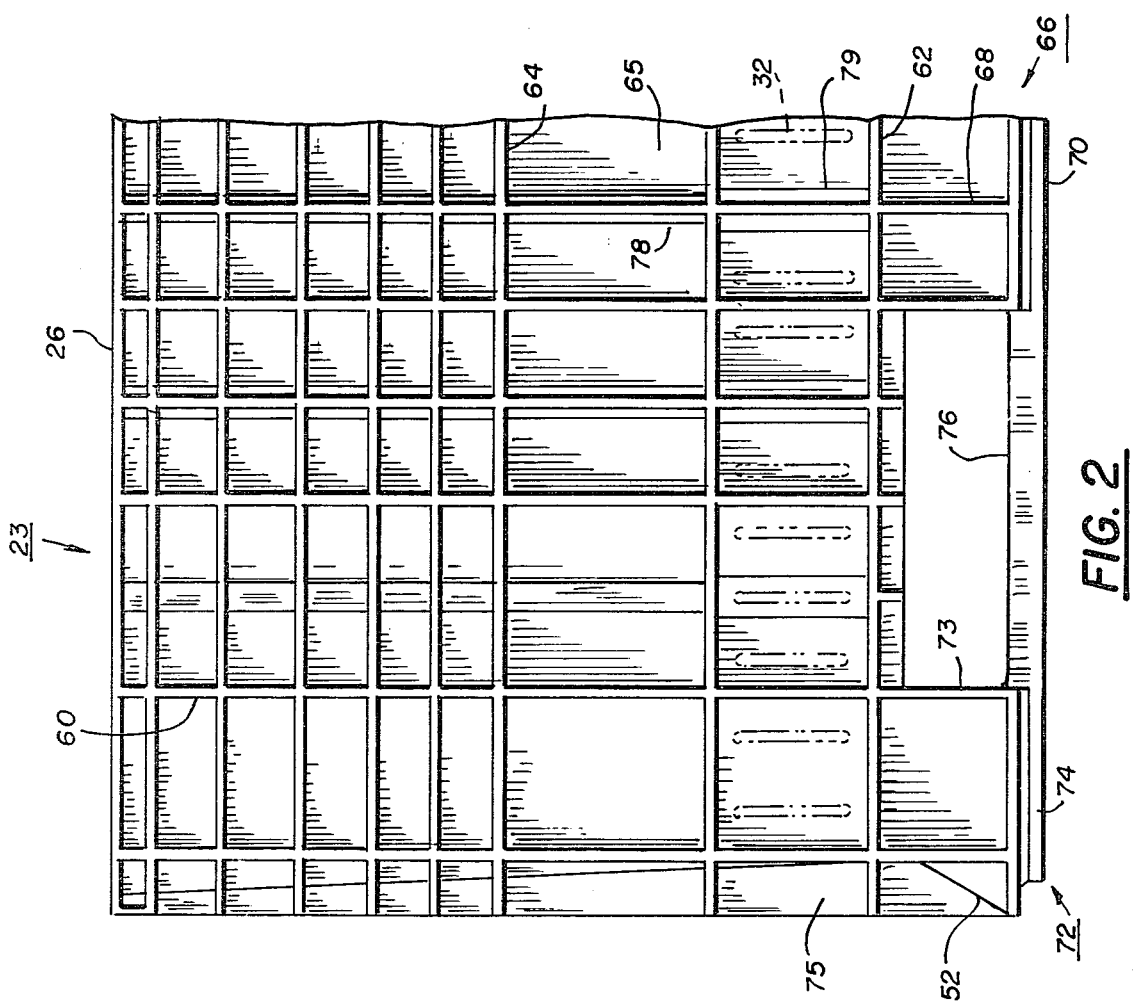

ONE PIECE MOLDED PALLET-CONTAINER

BACKGROUND OF THE INVENTION

1. Field of the Invention

With reference to the classification of art as established in the United States Patent and Trademark Office, the present invention is believed to be found in the general Class entitled, "Metallic Receptacles" (Class 220) and in the subclass entitled, "sectional" (subclass 4.0) and in the further subclass entitled, "stacked" (subclass 4C) and the subclass "knockdown" (subclass 4F).

Although this classification pertains to metallic containers, the pallet and container structure is generally found in the subclass and subclasses above-noted.

2. Description of the Prior Art

The use of plastic moldings in containers is well known and the molding of pallets from plastic is also a recently accomplished fact. Patents directed toward pallet container combinations made of plastic and as found in the pre-Ex search are: U.S. Pat. No. 3,416,692 to CLINE, et al., as issued on Dec. 17, 1968; U.S. Pat. No. 3,985,258 to QUIGLEY as issued on Oct. 12, 1976 and U.S. Pat. No. 4,000,827 as issued to EMERY on Jan. 4, 1977.

It is to be noted that CLINE shows a shipping container of plastic construction. This container does not show a pallet with a four-way fork lift opening or a one-piece construction. The QUIGLEY patent shows a pallet-container which provides a four-way entry for forks of a lift truck. The container as described and claimed is a knockdown unit with the sides removable from the bottom. Although a four-way pallet form is provided, this pallet is not unitarily molded but is reinforced by skid bars secured by screws. This container has no provision for the stacking and retaining of one pallet-container on another of a like size and configuration. The side panels in this showing are not tapered and ribbed to provide maximum strength for the supplied amount of plastic.

In U.S. Pat. No. 4,000,827 to EMERY the sides of the container are made of a like size and configuration. They are joined by screws at the corners and also to the bottom to provide the finished container. Only a two-sided opening for the entry of forks of a lift truck is provided. There is no contemplation of stacking of the container of EMERY nor provision for retaining such containers in a positive nested relationship if they are so stacked.

In the present invention there is provided a one-piece molded pallet-container usually having a four-way entrance capacity for a pair of forks of and on a lift truck. The pallet bottom is ribbed to provide the strength for lifting a loaded pallet by such forks. The sides of the container are vertically ribbed with tapering ribs to provide the side strength needed for fluid or near fluid loads. Horizontal ribbing is also provided to provide the desired stiffness and strength to resist side forces when a load is placed in the container. The bottom outer edge is reduced and contoured so as to provide a stacking capability. This stacking and nesting is easy and positive and at the seating shoulder is contoured to provide a four-way seating of one container on another.

In these and other known embodiments there has not been provided a one-piece pallet container of a large size such as a width of forty-four inches (1117.6 mm.), a length of forty-eight inches (1219.2 mm.) and a height of twenty-eight inches (711.2 mm.). As reduced to practice, a pallet container of a one-piece molding having the above width, length and height has been produced. The embodiment to be more fully described, in addition to a pallet-container of one piece, also contemplates that the mold may be provided with shut-off inserts to provide selectively positioned drain holes in the formed bottom and/or vent slots in the side walls.

The one-piece container also is formed at its top rim with a shoulder that is sized to be compatible with and retain a pallet-container when stacked thereon. The retaining rims and shoulders are formed to provide a shallow but positive seating and retaining of one pallet-container or another of like size and configuration. A separate one-piece molded cover member is contemplated and may be provided to protect the contents as stored in the container portion.

Although the above-mentioned pallet-container has a rectangular configuration, this is not to say that these sizes and configurations are the only sizes and configurations. For example, contemplated sizes include forty-four inches (1117.6 mm.) in width by forty-eight inches (1219.2 mm.) long by forty-two inches (1066.8 mm.) high. Other size containers may have a width of forty inches (1016 mm.), a length of forty-eight inches (1219.2 mm.) and a height of forty-two inches (1066.8 mm.). Other containers are forty (1016.0 mm.) by forty-eight (1219.2 mm.) by twenty-eight and three-quarter inches (730.25 mm.). Other pallet-containers are forty-seven inches square (1193.8 mm.) with one container twenty-eight and three-quarter inches (730.25 mm.) high and another container forty-two inches (1066.8 mm.) high. The foam plastic can be any thermoplastic material such as polycarbonate, polypropylene, polyacetal, polyamid, or polyphenylene oxide but most commonly high density polyethylene.

SUMMARY OF THE INVENTION

This invention may be summarized at least in part with reference to its objects.

It is an object of this invention to provide, and it does provide, a one-piece pallet-container which is of a sufficiently large size to accept bulky loads of substantial weights. This pallet-container may have a series of drain holes in its bottom extent and/or it may have vent slots or holes formed in its side walls.

It is an object of this invention to provide, and it does provide, a one-piece molded pallet container having a bottom support portion having entryways on four sides for the in-placing of a pair of forks of a fork lift truck on any of these sides of the pallet container. In addition to the four-way entry, the top rim and bottom support portion of the pallet container are compatibly formed to provide a positive nesting means whereby one container can and may be stacked on another of like configuration and size.

It is a further object of this invention to provide, and it does provide, a one-piece molded pallet-container of foam plastic and having integrally molded vertical and horizontal ribs as well as ribs extending below the bottom of the container. The horizontal and vertical ribs are disposed so as to increase in extent in proportion to the distance from the open top of the container toward the bottom. This increase in rib extent provides a proportional stiffening of the walls to compensate for an increase in side wall pressures or forces.

In brief, the pallet-container of this invention contemplates a one-piece molded member. It is preferably of foamed plastic with the interior having a drawing taper of about one degree extending from its maximum at the open top to diminish slightly as it reaches the bottom. The top rim is formed with a contour or shoulder and a like male and mating contour is formed on the bottom corner legs and intermediate support portion of this pallet-container. The four sides are integral with the bottom and leg portions and include external ribs that are tapered in their extent as they, the ribs, extend from the open top to the bottom, and when and where they coincide with four corner end intermediate support portions of the pallet-container these vertical ribs continue into these portions below the bottom member of the pallet-container to provide the needed and desirable strengthening and stiffness to these downwardly extending members.

There is also provided horizontal ribs on the side portions. These horizontal ribs extend between and join the vertical ribs to increase the resistance of the side members to bending and possible breaking. The bottom, on its downwardly extending surface, is formed with a waffle-type grid arrangement of ribs. This grid provides the stiffness and strength to this bottom member. This grid of ribs also provides support surface portions or means for the forks of a fork lift truck. In an improved version, the ribs are arranged as determined by a computer to provide the maximum support for a given amount of plastic.

The mating contour of the top rim and bottom of the pallet-container and the molded cover are shown in two embodiments. In one embodiment a chamfer is shown and in another embodiment a shoulder is shown. Other arrangements for positive stacking of the containers one above another, with or without an applied cover, are shown. No matter the contour, the lower support surface is adapted for resting on and transporting along a roller conveyor. The lower edge of the pallet-container is formed so as to have no sharp edges at the support line to cause an impediment on the roller conveyor.

In addition to the above summary the following disclosure is detailed to insure adequacy and aid in understanding of the invention. This disclosure, however, is not intended to cover each new inventive concept therein no matter how it may later be disguised by variations in form or additions of further improvements. For this reason there has been chosen a specific embodiment of the one-piece molded pallet-container as adopted for use in transporting selected products in bulk and showing a preferred means for molding this pallet-container. This specific embodiment and an alternate embodiment thereof have been chosen for the purposes of illustration and description as shown in the accompanying drawings wherein:

BRIEF DESCRIPTION OF THE DRAWINGS

FIG. 2 represents a partial front elevation of the pallet-container of FIG. 1, this view taken on the line 2—2 of FIG. 1 and looking in the direction of the arrows;

FIG. 9 represents a fragmentary sectional view of a rest portion of a bottom corner of a pallet-container, this view taken on the line 9—9 of FIG. 7 and looking in the direction of the arrows;

FIG. 10 represents a fragmentary sectional view of the bottom of the pallet-container, this view taken on the line 10—10 of FIG. 7 and looking in the direction of the arrows;

In the following description and in the claims various details are identified by specific names for convenience. These names, however, are intended to be generic in their application. Corresponding reference characters refer to like members throughout the several figures of the drawings.

The drawings accompanying this specification disclose certain details of construction for the purpose of explanation but it should be understood that structural details may be modified in various respects without departure from the concept and principles of the invention and that the invention may be incorporated in other structural forms than shown.

PALLET-CONTAINER OF FIG. 1

Figure 1:
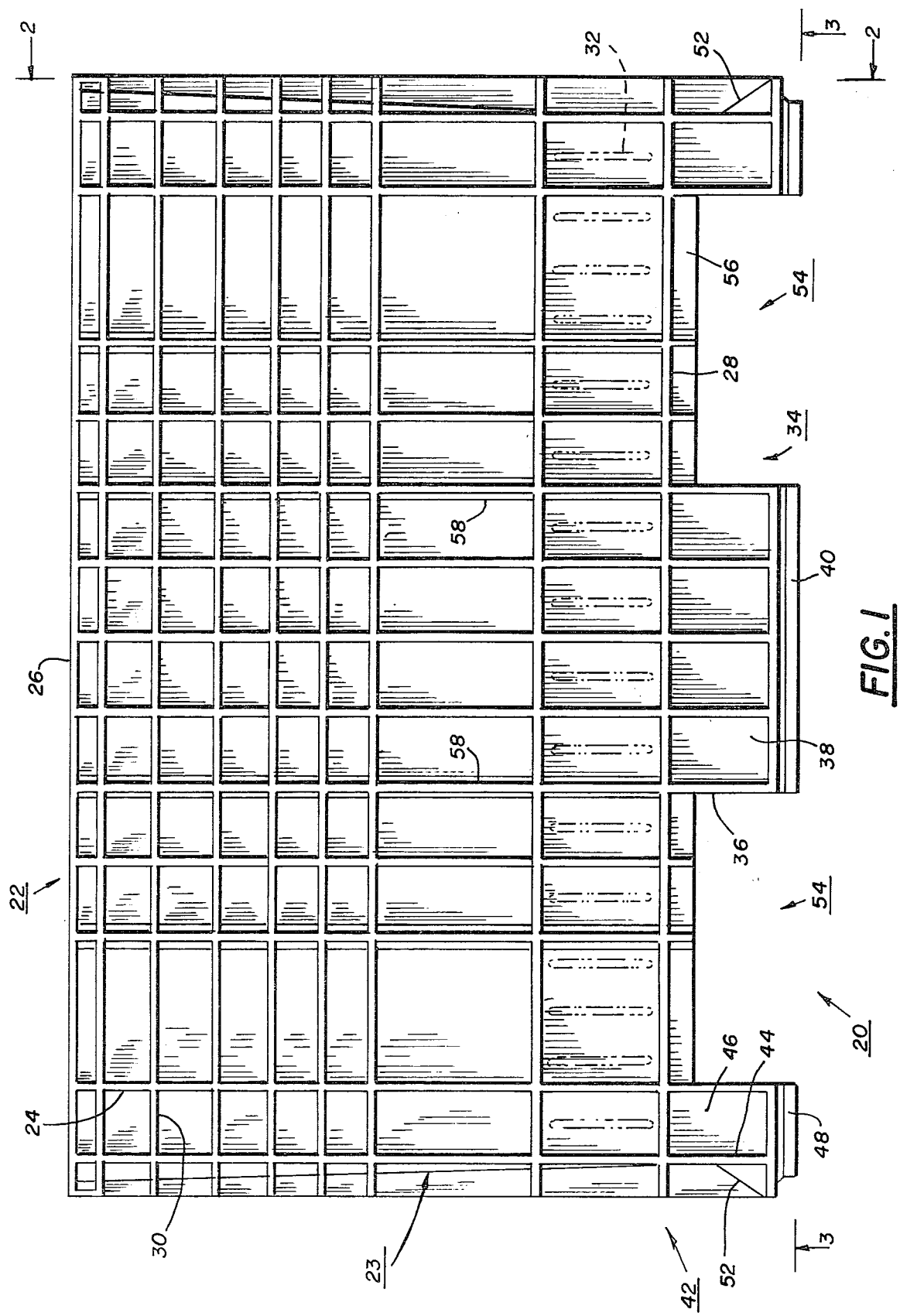
FIG. 1 represents a side elevation of a one-piece molded pallet-container of this invention and showing one embodiment of the pallet-container.

Referring now and next to the drawings and in particular to FIG. 1, there is shown in side elevation the one-piece pallet-container of this invention which is generally identified as 20. This pallet-container has two side panel members generally identified as 22 and end panels generally identified as 23. Although pallet-container 20 is illustrated and described as rectangular, this does not preclude square or nearly square configurations as noted above.

Vertically arranged ribs 24 extend from a top rim 26 to a lower horizontal outwardly extending rib 28 extending around the bottom member of the pallet container 20. A plurality of horizontal outwardly extending ribs 30 intermediate the top and lower rib is also formed on the side panels and is integrally joined to the vertical ribs 24 between the top rim 26 and the lower rib 28.

Side vents 32, shown in phantom outline, may be provided in the side panels 22 when desired and as indicated are between vertical ribs so as to not reduce the strength of the molded side walls. Extending downwardly from the lower horizontal rib 28 is center support member 34. This member, as shown, has five vertical ribs 36 which are a continuation of above ribs forming the side wall 22 and the inner wall which is identified as 38. This center terminates with a contoured base portion, identified as 40. This contoured base portion is shaped to provide a seating means for placing and retaining this pallet-container in the top rim of a like molded container.

This pallet-container also has each of four corners formed to provide a support for the pallet-container. Each corner, generally identified as 42, and as viewed, has two downwardly directed ribs 44. These ribs are a continuation of the abovevertical ribs. A side wall portion 46 extends between ribs 44, the lower outstanding rib 28 and a bottom rim supporting contoured portion 48. Like the mid-member contoured base portion, identified as 40, these corner supports 42 also have their like contoured lower portion to provide a male-shaped shoulder which establishes a seating means for placing this container on the top rim of a like-molded container.

As seen, on each corner portion there is also provided a diagonally disposed reinforcing rib 52 exterior of the side wall portion 46. This rib 52 is more fully seen in the fragmentary view of FIG. 11, but it is to be noted that this reinforcing portion on each of the corner sections provides additional support for the outer leg and for the contoured lower portion. Although the diagonal rib 52 is shown terminating before the horizontal rib 28, this corner reinforcement may be extended upwards to the top rim 26. The length and configuration of the diagonally placed corner reinforcement is dependent on the anticipated side loads, the load carrying capacity of the pallet-container when one or more pallet-containers are stacked in a vertical array and/or the design of the mold of the one-piece container.

Figure 3:
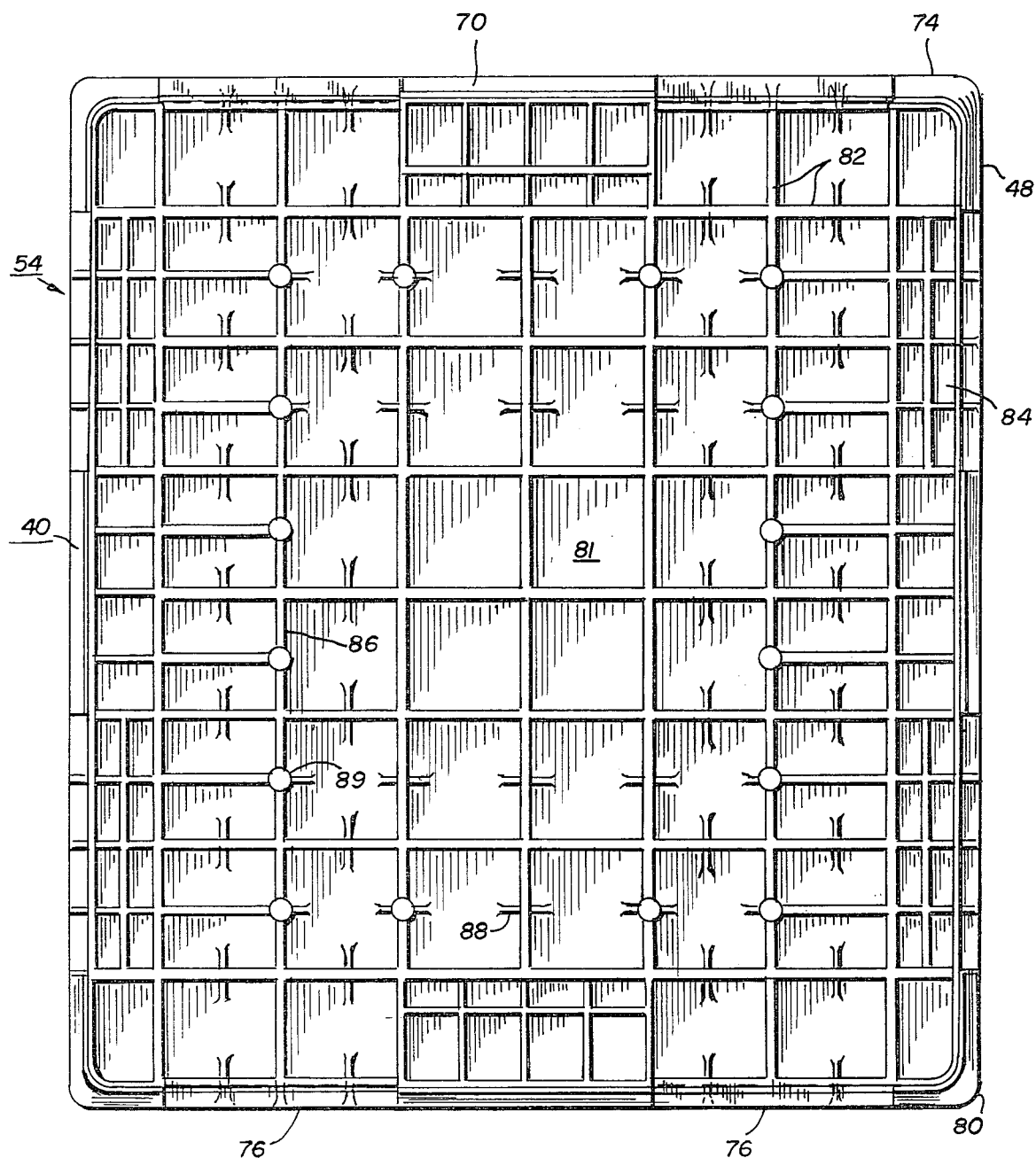
FIG. 3 represents a partial bottom view of the pallet-container of FIG. 1, this view taken on the line 3—3 of FIG. 1 and looking in the direction of the arrows.

Between this corner section and the intermediate section there is depicted an entryway 54 which provides a pathway for the forks of a lift truck, not shown. These entryway portions, generally identified as 54, include downwardly extending short rib portions 56 and vertical ribs which are arranged as waffle portions. These entryway portions for the forks of a lift truck are more readily seen when viewing the bottom of the pallet-container, as seen in FIG. 3. The front elevation is shown as about four inches (101.6 mm.) longer than the side extent and includes additional strength vertical ribs 58 which are disposed at four places intermediate their ends to provide an additional strength to the side wall. As in the front elevation, the ends of the pallet have shallow ribs additionally formed in the vertical extent to provide a strengthening for the side panel 22. The cutouts or vents 32 may provide side venting where and when desired. The corners of these pallets, as seen in the front elevation, include an approximately three inch (76.2 mm.) leg portion which includes a diagonal rib 52.

END PANEL OF FIG. 2

Referring next to FIG. 2 and the fragmentary or partial end view depicted, it is to be noted that this view shows only the left half of an end panel 23. Vertical ribs 60 extend from the top rim 26 to and beyond a horizontal rib 62 which coincides with the horizontal rib 30 of the side panel. Horizontal ribs 64 extend the length of the unit and are integrally formed with the ribs 60 and wall 65. These ribs 64 are parallel to the top rim 26. Below the horizontal rib 62 there is formed a central support portion 66 similar to the center support 34 formed on the sides of the pallet-container. As in the side elevation of FIG. 1, this center portion has downwardly extending rib portion 68 which extends between end panel or wall portions 65 to terminate at a bottom section 70 to form a contour for the seating, placing and retaining of this pallet-container on a like pallet-container therebelow. On each end of the end panels are corner members 72 formed with two downwardly, outwardly extending vertical walls 73 which terminate at a horizontal section 74. This section is formed to provide a contour base portion shaped to provide a plug-type seating means for positioning and retaining the pallet-containers one above another. Between the center portion and the corner portion of and on the base, there is formed a stiffening or reinforcing rib 76 which is more fully seen in FIG. 3 depicting the bottom view of the pallet-container. As in the side elevation of FIG. 1, the vertical ribs 60 taper from a top rim 26 and extend outwardly to the bottom. This taper increase provides a strengthening of the outer corners.

These end panel members may also have cutouts or vents 32 formed in the end wall 65. These vents are selectively formed by shut-offs in the mold process. The wall has additional strength vertical ribs 78 which, as shown, become wider at 79 in the wall area between the horizontal rib 62 and the next above horizontal rib. The diagonal stiffening rib 52 is also seen in this view.

BOTTOM VIEW AS SEEN IN FIG. 3

Referring now to the pallet-container as seen in FIG. 3, it is to be noted that the corners are made more-or-less rectangular with the extreme outer portion of the corners curved or radiused at 80 to provide a smooth transition from one panel to the other panel. It is to be noted that this base or bottom 81 is depicted as generally rectangular in shape to show the approximately four inches (101.6 mm.) greater length than width.

As above noted, the configuration of the pallet-container may be square or nearly square and this four inches (101.6 mm.) in sides is merely disclosed in connection with a size as shown in this FIGURE.

Each of the pallet entryways, as seen in FIGS. 1 and 2, provide for the forks of a lift truck and are disposed so that the forks may slide upon the downwardly extending portions between the corner portion and the midportion. The reinforcing bar 76 at the entryway for the forks of the lift truck cooperate with ribbed extending portions 82, as seen in FIG. 3. The contoured flange portions 40 and 70 are provided at the intermediate portions. Contoured portions 48 and 74 are provided at each corner. Four open bottom recesses 84 are provided with ribs at the entryways 54 on the side panels 22.

This bottommost surface including ribs at the corners and intermediate portions and reinforcing bar 76 are disposed to provide a support means for carrying the pallet-container, either loaded or unloaded, on a roller-type conveyor, not shown. The pallet-containers may be placed on such conveying devices for loading purposes and/or transport to a truck. The contoured edges of the pallet-containers accommodate the rollers of such a conveyor without hangups on sharp corners.

The central support 34 is also provided with four recesses which are connected by means of short vertical ribs 86 to mate and form a general waffle-type rib pattern, as provided on the underside of the pallet-container. This waffle-type rib has many small tapered supports 88 and also is provided with a pattern for the entrance of foam plastic through gates 89. It is to be noted that the tapered supports 88 in addition to strengthening ribs 86 also provide guiding means for directing the incoming tips of of the forks of the lift truck. These tapered portions 88 insure that the tip or entering ends of the forks do not engage the ribs 86 but slide underneath the ribs. Cutouts or shutoffs providing vents are indicated as 90. These may be carried in the force member as inserts. As the force member is closed, it will contact a mold wall to cause openings to be provided in the bottom of the pallet for vents, when desired.

It is to be noted that the bottom view shows a waffle grid of ribs. The corner portions and intermediate support members extend from the floor of the pallet-container and provide the desired spacing of this pallet-container above the floor for free entry and withdrawal of the forks of a fork lift truck or apparatus. The contoured edge for maintaining this pallet-container on the top rim or opening of a next lower pallet-container is only on the downward or lower edge of the four corner members and the intermediate members. Gate portions 89, as shown, are only typical of such a one-piece pallet-container and gates can be located at many other places on this bottom of the pallet-container.

SECTIONAL VIEW AS SHOWN IN FIGS. 4A AND 4B

Figures 4A, 4B:
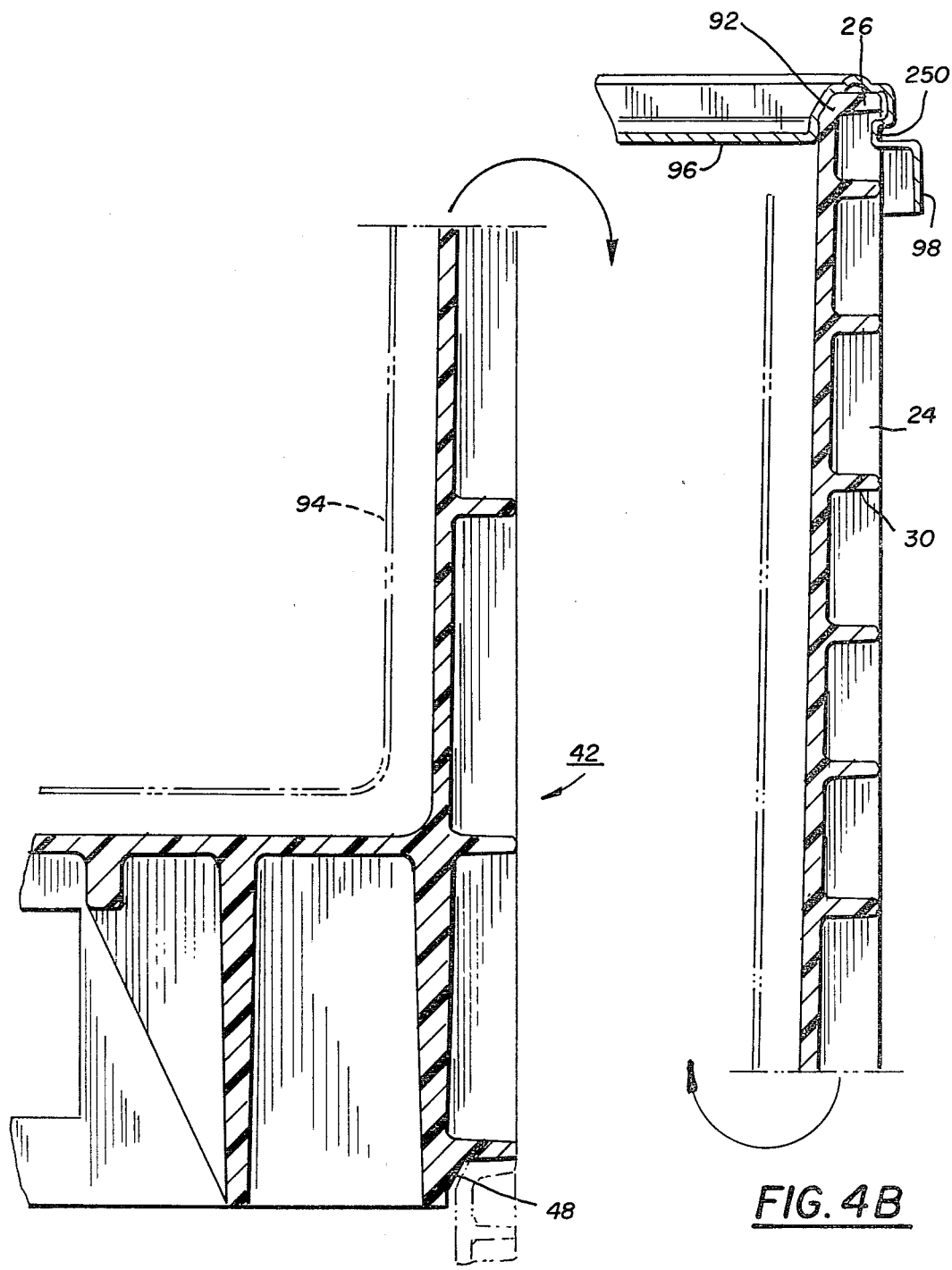
FIG. 4A and FIG. 4B represent fragmentary, sectional views of a typical side of the pallet-container of FIG. 1 and showing in particular the means for nesting and retaining similar pallet-containers in a stacked array and for mounting a cover on the top rim of a container.

In FIGS. 4A and 4B is shown a typical sectional view depicting the side configuration of the pallet-container. This view shows a contoured corner and the beginning of the entryway 54 or opening for the fork, as seen in FIG. 1. Shown particularly is the contoured bottom as adapted for the stacking of the containers one on top of the other to provide the desired stacking retaining means. Also is shown a typical installation of a cover, later described.

As shown, this sectional view is of the longer side but the construction is typical of all the walls and the bottom. The top rim 26 of the pallet-container depicted has a chamfer 92 which extends around the top of the pallet-container 20. The vertical ribs 24 and horizontal ribs 30 are shown as increasing in extent from the top 26 to the bottom. A bottom contour 48 is formed as a portion of the bottom, outer horizontal rib. This corner portion 42 also has heavier downwardly projecting ribs. In phantom outline is shown a foam liner 94 which may be applied as an additional plastic portion on both sides and bottom of the pallet-container. This liner is directed toward special conditions, and is more fully described with reference to the later described FIGURES.

A cover 96 is shown mounted on the top of the pallet-container. This cover, as depicted, is preferably a one-piece member with an outer rim portion that snaps in place over the top of the pallet-container. The cover may have an outstanding grasp portion 98 by which the cover may be manipulated for hand removal from the pallet-container.

Other cover configurations are shown in later described FIGURES. The cover is made to suit the pallet-container provided and is merely to protect the contents as well as furnish a means for supporting above stacked containers.

IMPROVED CONTAINER OF FIG. 5

Figure 5:
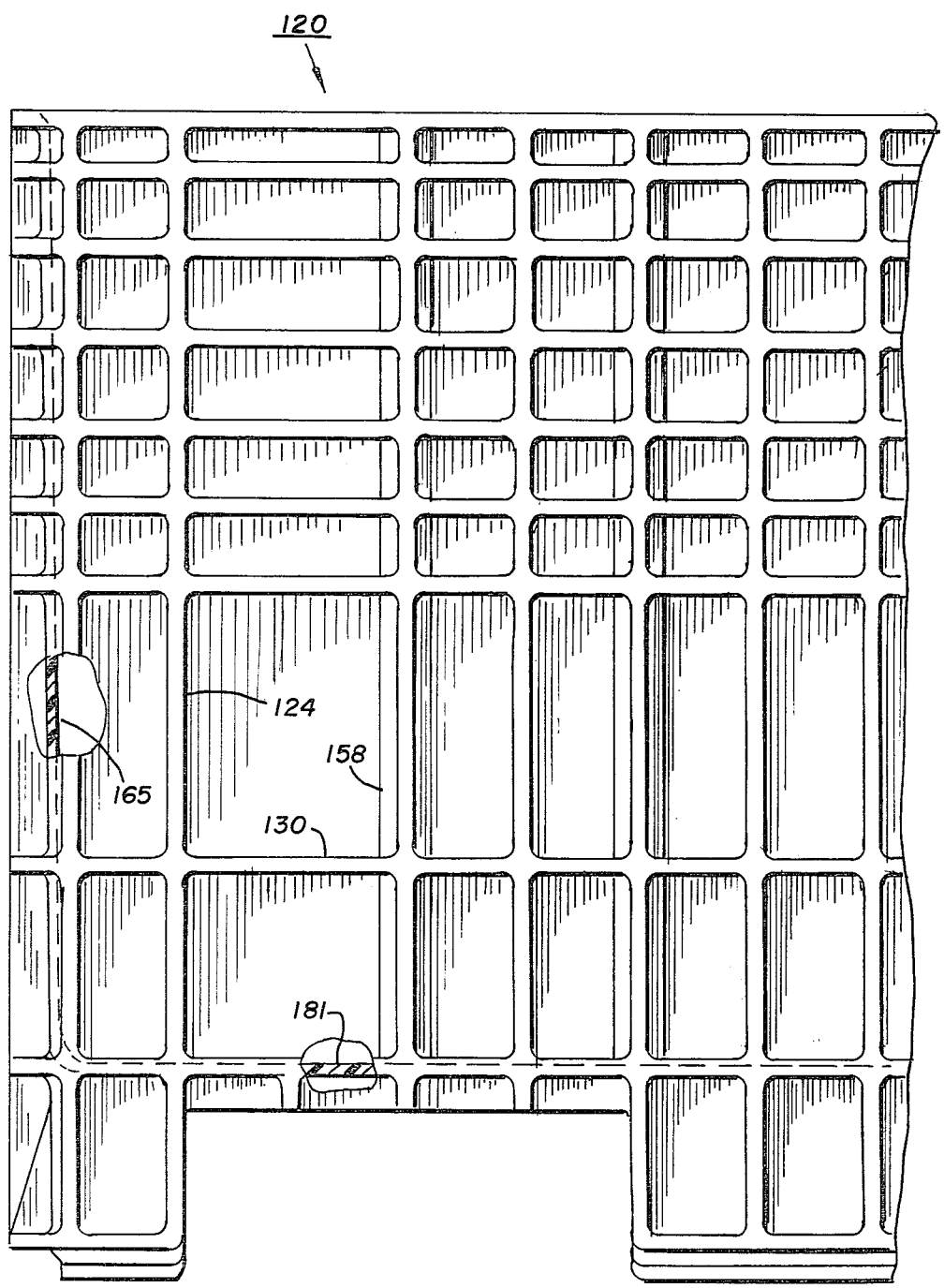
FIG. 5 represents a fragmentary side elevation of a one-piece pallet-container similar to that of FIG. 1 but in an enlarged scale and having additional ribbing reinforcements molded as a part of the one-piece unit, this additional ribbing reinforcement providing the additional strength needed to withstand larger loads, this view additionally having typical small sectional views showing side and bottom construction.

In FIG. 5 there is shown a front view of an alternate pallet-container which is very similar to that shown in FIG. 1. This pallet-container 120 is made of a foamed plastic throughout. This member 120 has thickened vertical ribs 124 which are integrally formed with thickened horizontal ribs 130. An end wall 165 is shown in section as a partly fragmentary, broken-away portion. In a like manner, the reinforcing rib 158, in the manner of reinforcement 58, provides an additional resistance to unwanted bending of the side wall. Except that the ribs, corner legs, intermediate or central supports are made thicker and of foamed plastic, this pallet-container is like the container of FIG. 1. The bottom 181 is also thicker with the top and bottom contour generally like or very similar to the bottom as formed on the pallet-container of FIG. 1.

END VIEW OF FIG. 6

Figure 6:
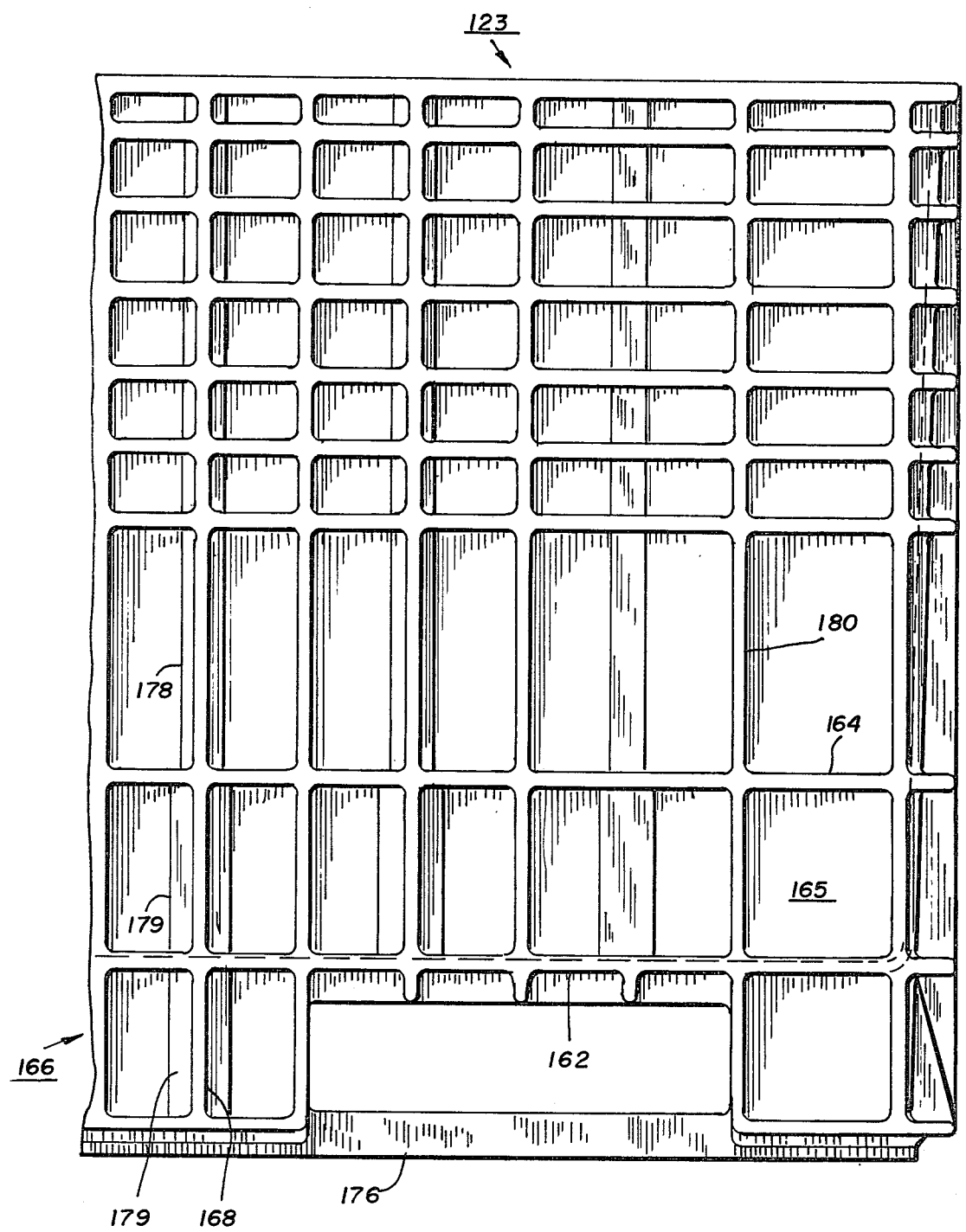
FIG. 6 represents a fragmentary front elevation of the pallet-container of FIG. 5, this view taken on the line 6—6 of FIG. 5 and looking in the direction of the arrows.

Referring next to FIG. 6, there is shown in an enlarged scale a partial view of the left end of the pallet-container of FIG. 5. This view shows the left end of a pallet-container and the right end, not shown, is a mirror image of this left end shown. This view shows a pallet-container similar to that shown in FIG. 2. The vertical ribs 160 and horizontal ribs 164 are integrally molded with end wall 165 and the rest of the pallet-container. These ribs, the end wall, the bottom, the corner members, the central support and the top rim are made heavier than the pallet-container of FIG. 2. The contoured top and bottom are made to facilitate and insure positive stacking of one unit on a like below pallet-container. It is to be noted that the reinforcing stiffening 178 is increased in width 179 on the lower extent just above the bottom horizontal rib 162 and at the vertical rib 168 the widened stiffening 179 is carried downwardly and into the central support 166.

FRAGMENTARY BOTTOM VIEW OF FIG. 7

Figure 7:
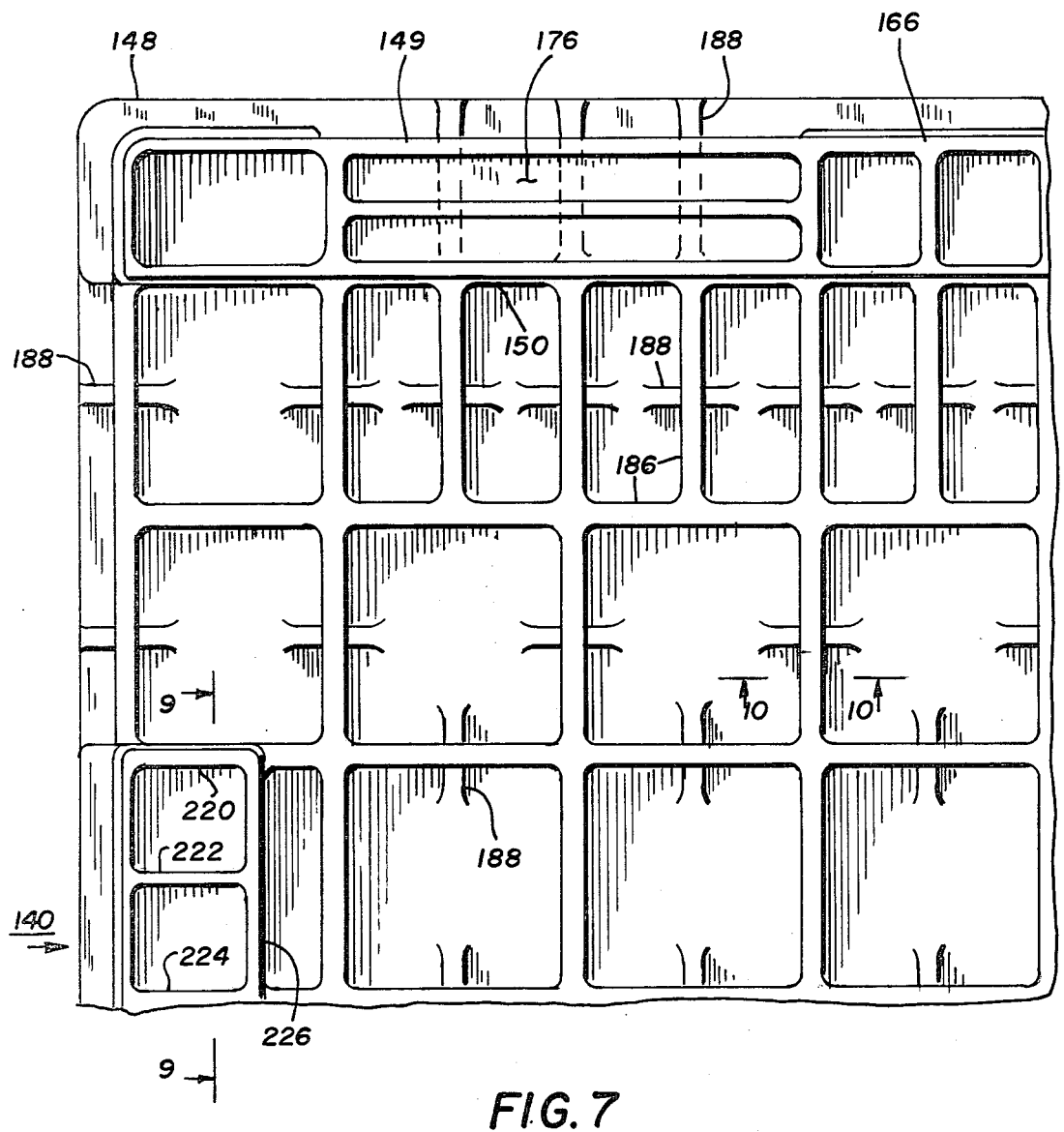
FIG. 7 represents a fragmentary bottom view of the pallet-container of FIG. 5, this view taken on the line 7—7 of FIG. 5 and looking in the direction of the arrows.

Referring next to the fragmentary bottom view of FIG. 7, it is to be noted that only the upper left quarter of the bottom view as in FIG. 3 is shown. In this view the curved corner 148 is adjacent ribs 149 and 150 which extend downwardly and from a part of stiffening strut 176. Shown in part and to the right of strut 176 is central support 166 which includes a waffle pattern of ribs. The downwardly extending ribs 186 are thicker than those in FIG. 3 and stiffeners 188 are provided at every rib except the corners 148 and central support 140 and 176. The ribs 186 extend downwardly about one inch (25.4 mm.). The tapered reinforcement 188 may be at thirty-five to forty-five degrees.

As in the chamfered reinforcements 88, above-described, the tapered portions 188 in addition to stiffening and supporting ribs 186 also provide a guide for and insure that entering ends of the forks of a fork lift truck do not engage a rib 186 sufficiently to cause it, the pallet-container, to be moved as the fork is moved inwardly.

SIDE VIEW OF CONTAINER AS IN FIG. 8

Figure 8:
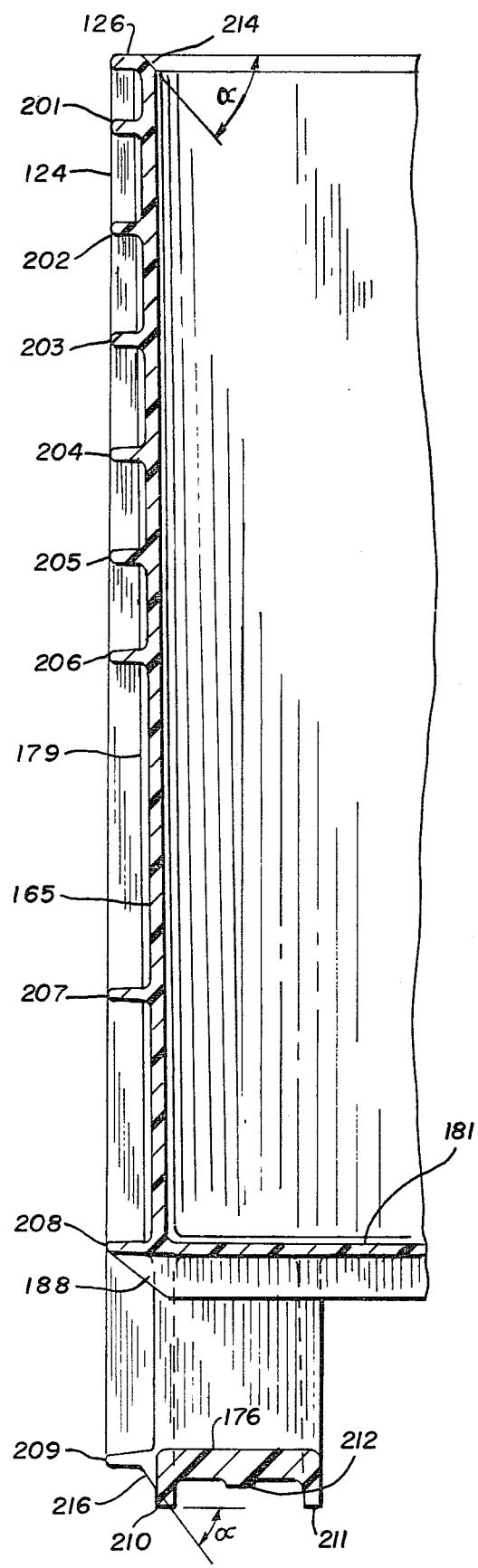
FIG. 8 represents a fragmentary sectional view of a typical side of the pallet-container of FIG. 5 and showing particularly the means for nesting and retaining similarly formed pallet-containers in a stacked array, this view taken on the line 8—8 of FIG. 6 and looking in the direction of the arrows.

Referring next to FIG. 8, it is to be noted that the depicted construction of the improved pallet-container uses a foam plastic construction throughout. A top rim 126 is about one inch (25.4 mm.) in width and includes a contoured angle which, as reduced to practice, is fifty-five degrees included. The vertical ribs 124 are substantially normal to the plane of the top and seating surfaces. The depicted depth of the container, exemplified, is twenty-four inches (609.6 mm.) with an overall height of twenty-nine and three-eighths inches (746.13 mm.). The height mentioned is merely a matter of selection and as noted previously may be less or much greater. A draft of about one degree is provided on both the inner and outer wall to maintain a more-or-less parallel wall thickness.

For the purpose of ready identification, the horizontal ribs in this view have been serially numbered beginning at 201 through 209.

Downwardly extending rib portions have been numbered 210 and 211 with an intermediate rib 212 forming a portion of the stiffening strut 176. Rib 201 is about 1.4 inches (35.56 mm.) from the top. Rib 202 is about 2 inches (50.80 mm.) below rib 201. Rib 203 is about 2.3 inches (58.42 mm.) below rib 202, and rib 204 is also about 2.3 inches (58.42 mm.) below rib 203. Rib 205 is about 2 inches (50.88 mm.) below rib 204 and rib 206 is also about 2 inches (50.88 mm.) below rib 205. Rib 207 is about 7 inches (177.80 mm.) below rib 206. Bottom 181 and rib 208 is about 5 inches (127.00 mm.) from rib 207 and about 4.35 inches (110.49 mm.) from rib 209. The bottom ends of ribs 210 and 211 are slightly less than one inch (25.4 mm.) below rib 209. Rib 212 projects about two-tenths inch (5.08 mm.) below strut 176 which is about six-tenths inch (15.24 mm.) thick.

Wall 165 is about one-quarter inch (6.35 mm.) in thickness and the added stiffener rib 179 is about one-eighth inch (3.176 mm.) thick. The angle 214 around the top rim is at the same angle and provides a tapered seat for plug angle 216 provided on the corner legs and the intermediate portions, above-described. The inside shoulder provided by the downwardly projecting rib 210 and like portions on the intermediate supports are less than the open top of the pallet-container. This reduced size of the lower portion of the container enables easy and positive stacking of containers one above the other.

VIEW AS IN FIG. 9

Referring next to the sectional view as seen in FIG. 9, there is shown a fragmentary, sectional view in an enlarged scale with the ribs forming the intermediate support 140. Rib 220 extends from the bottom 181 to the support bottom 221. The entryway is to the left of rib 220. Ribs 222 and 224 terminate a short distance from the floor but rib 226 extends to the floor. Inner rib 186 is at a level of the entryway for the forks and provides a portion of the grid for the forks of a lift truck. The floor or support surface 221 establishes the area which is adapted to rest on a roller conveyor, not shown.

VIEW AS IN FIG. 10

Referring next to the sectional view as seen in FIG. 10, there is depicted a fragmentary sectional view of a typical intermediate rib 186 which extends below and is a part of and strengthens floor or bottom 181. These ribs are further strengthened and stiffened by tapered rib portions 188 which extend from each side of the rib. These tapered rib portions are also disposed at each entryway to assist and facilitate the entry, placing and withdrawal of the forks from the bottom of the pallet-container. As noted above and as particularly seen in FIG. 10, the diagonal or ramp surfaces provided by the tapered ribs 188 extend to the bottom extending surface of each rib 188 to insure an easy slide past the edge of the rib by the entering fork.

VIEW OF FIG. 11

Figure 11:
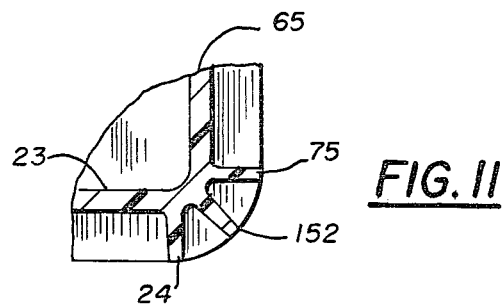
FIG. 11 represents a fragmentary bottom view showing a diagonal rib as provided on the four leg corners of the pallet-container of FIGS. 1 and 5.
Figure 13:
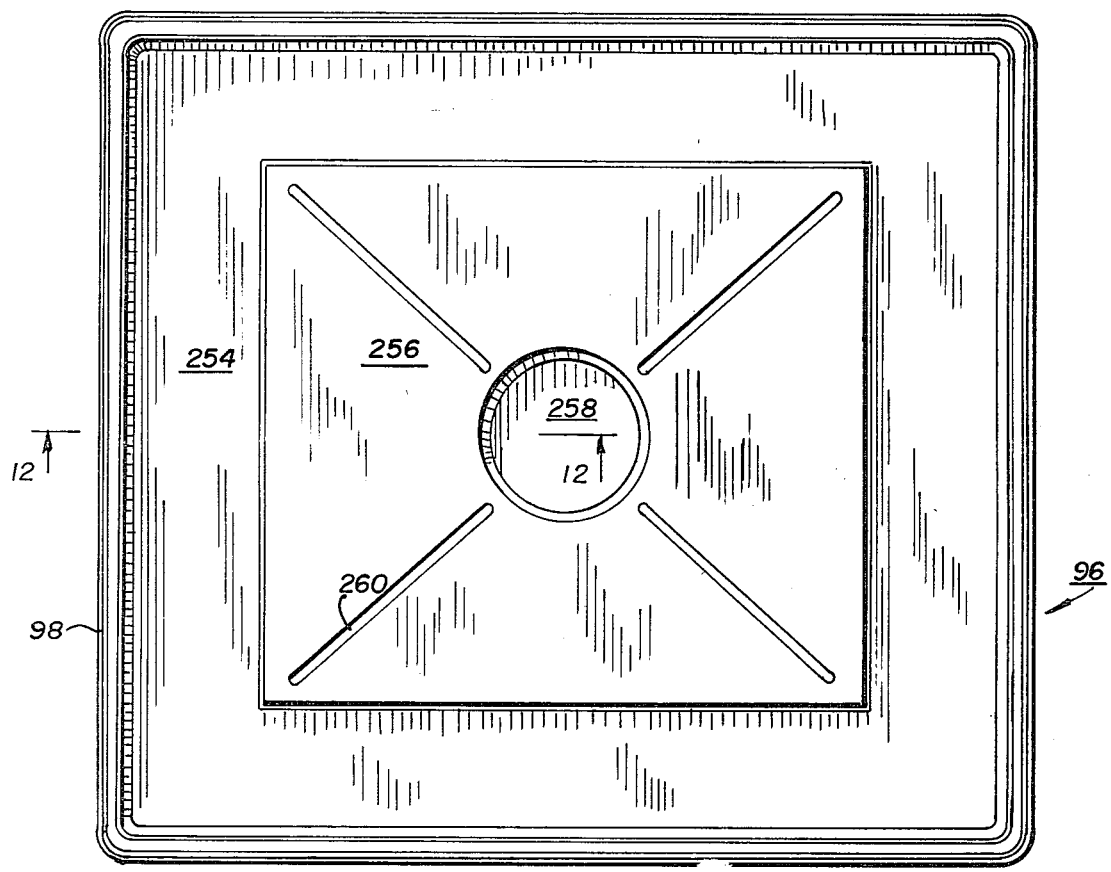
FIG. 13 represents a sectional side view of the cover of FIG. 12, this view taken on the line 13—13 of FIG. 12 and looking in the direction of the arrows.
Figure 12:
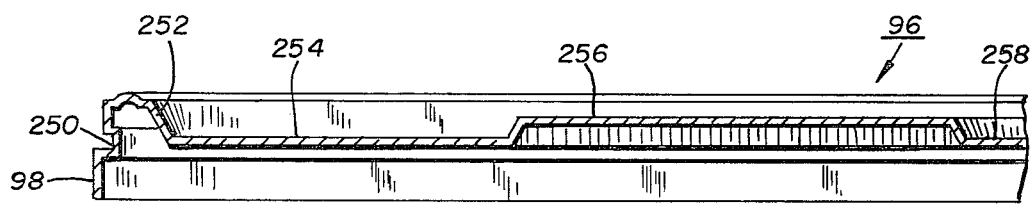
FIG. 12 represents a plan view of one embodiment of a cover member for a pallet-container.

Referring next to FIG. 11, there is depicted a fragmentary view of a typical corner. Walls 23 and 65 are joined at a small radius. A diagonal rib 52 is disposed at forty-five degrees and below the bottom of the pallet-container to reinforce and stiffen the corner legs of the pallet-container. Vertical ribs 24 and 75 extend downwardly the face of the pallet.

As previously noted, the corner member 52 or 152 extends upwardly an amount as determined or selected by the designer. Diagonal ribs may extend from the floor level.

COVER AS IN FIGS. 12 AND 13

Referring next to the drawings and a cover 96 shown preferably made as a one-piece molding. The cover depicted is made in a rectangular shape to conform to the shape of the pallet-container. This cover is generally identified as 96 and has a skirt portion 98 which extends sufficiently for grasping to remove the cover from the top of the container. The cover may have relief portions formed in underlip 250 to accommodate the ribs 24 and 60. Alternately the upper portion of the pallet-container at the rim 26 may have the vertical ribs immediately below this rim formed to accept this underlip of the cover. The cover at 252 is sloped to provide a seat on the slope 92 of the top of the pallet-container.

As shown, the cover has a trough portion 254 next to and inside the slope portion 252. A raised portion 256 is shown adjacent the trough portion. A central portion 258 may also be provided. Stiffening ribs 260 may also be diagonally disposed in the portion 256 to assist in cover stiffness or rigidity. This cover design is merely a matter of selection as are the areas designated 254, 256, 258 and ribs 260. Other cover designs are shown and described in later FIGURES.

MOLDING APPARATUS AS IN FIGS. 14 AND 15

Figure 14:
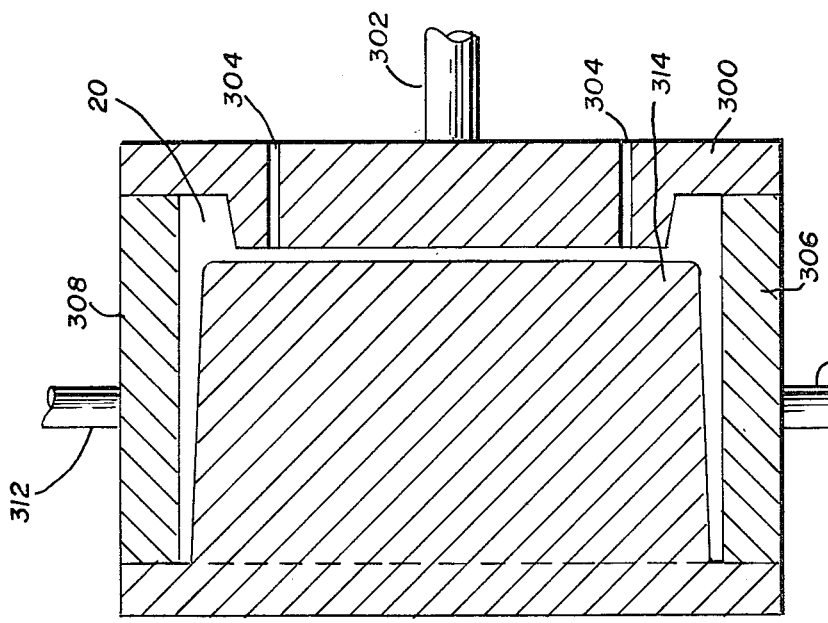
FIG. 14 represents a somewhat diagrammatic view of the mold as closed for injecting the foamed material to produce the one-piece pallet-container of this invention.
Figure 15:
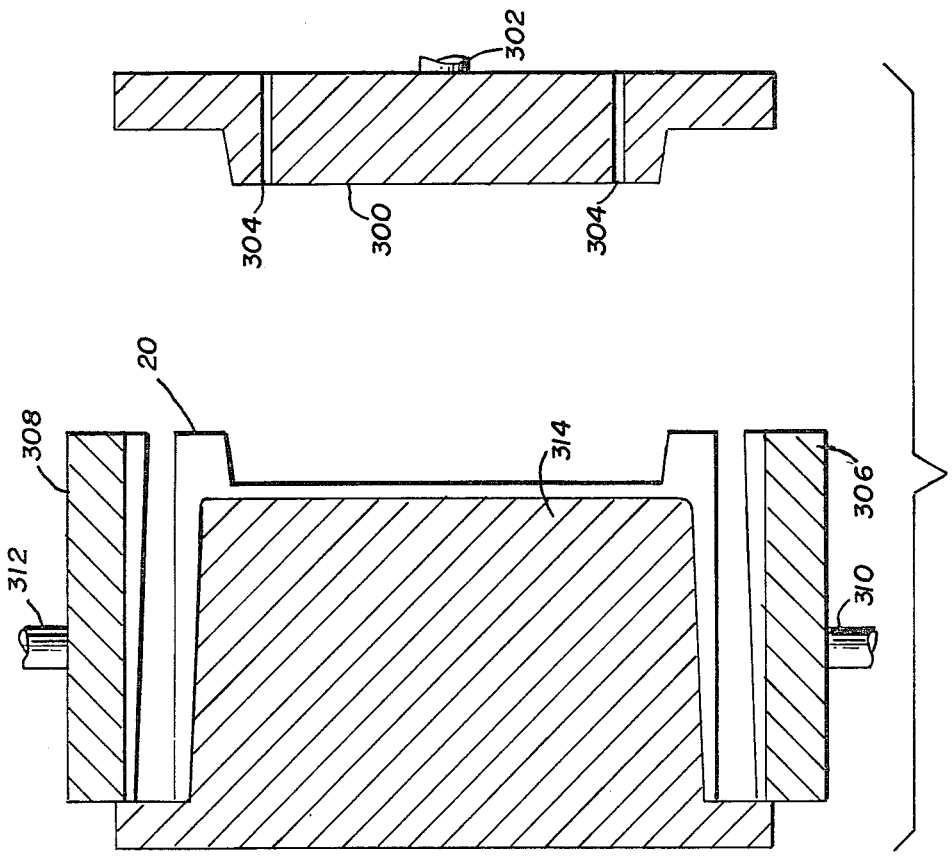
FIG. 15 represents the mold of FIG. 14 as opened for the removal of the molded pallet-container of FIG. 1 or FIG. 5.

Referring next to FIGS. 14 and 15, there is seen a mold and apparatus whereby the one-piece pallet-container is made as above-identified. In FIG. 14, the molding apparatus is shown as closed. The fixed portion of the mold, identified as 300, has a sprue nozzle 302 which leads into a gate pattern, not shown. Sprue inlets 304 lead from the gate pattern to the rib grid extending from the pallet-container bottom. Four side members are carried on slides, not shown, and are moved by cylinders or the like mechanisms. Upper and lower side members 306 and 308 are shown in FIGS. 14 and 15 but it is to be noted that front and back members are also required. Rods 310 and 312 respectively are attached to side members 306 and 308 and are movable in and out to carry the outer sides of the mold to and from closing condition to open condition to form the horizontal and vertical ribs in the pallet-container 20.

A force 314 is movable toward and away from the fixed mold portion 300. This force has a desired taper extending from the top which as viewed is at the right. Not shown are knockout pins conventionally carried in the force and actuated to remove the molded container from the opened mold assembly. Cooling channels for water and other conventional treatments for molding plastic and particularly foam plastic are not shown.

It is to be noted that a timing sequence for at least opening the mold is essential. If an incomplete "cure" of the molded plastic is made, then a tearing of the ribs is possible. If the sides are moved from the molded product first, then the force can be moved to the right sufficiently for the knockouts to be actuated and the molded product removed.

PALLET-CONTAINER OF FIG. 16A

Figure 16A:
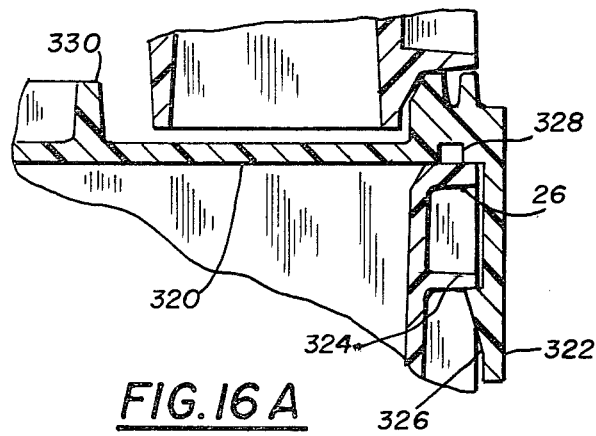
FIG. 16A represents a fragmentary side sectional view showing a pallet-container top rim with a cover mounted thereon with preferred latching means and showing a container in a stacked array on the mounted cover.

In FIG. 16A is shown a fragmentary, sectional side view showing an alternate cover construction. A cover generally identified as 320 is constructed with integrally formed latch members 322. Preferably there are two latch members to engage each of the four sides or ends of the pallet-container. A horizontal rib 324 extends as a continuous band or outward protrusion from the side wall of and near the top of the pallet-container. The latch portion 322 at its downward inner portion is formed with a camming surface 326. The lowermost portion of the latches are larger and slide by rim 26 and rib 324 and the cover seats on the top of the pallet-container. A groove 328 is formed in this cover for the mounting therein of an O-ring, not shown, providing a gasket or seal. A rib 330 may be provided to stiffen the cover expanse. Above the rim 26 of the pallet-container the cover is made so as to provide a seating support for an above container.

PALLET-CONTAINER AND COVER OF FIG. 16B

Figure 16B:
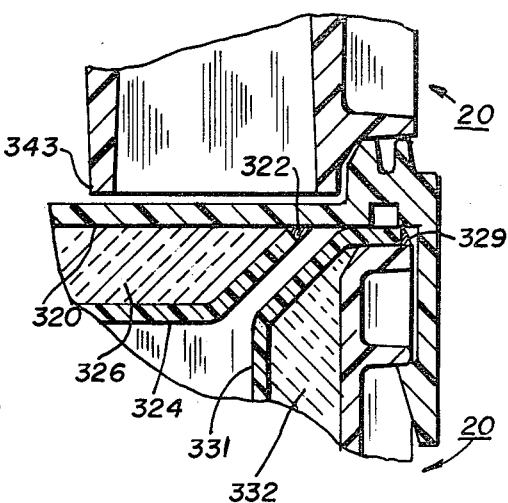
FIG. 16B represents a fragmentary side sectional view of the container and cover as in FIG. 16A with both having an attached inner member which is disposed to retain additional insulation.

In FIG. 16B is shown the container and cover of FIG. 16A with an added insulation means applied to both the inside of the cover and pallet-container. To the underside of cover 320 there is attached as by heat welding at 322 a formed sheet of plastic 324. Foam plastic 326 or any readily available insulating material is inserted in the space between cover 320 and the formed sheet 322 and before the attachment of sheet 324.

In a like manner, to the inner wall of the pallet-container 20 is attached as by heat welding at 328 a formed plastic sheet 330. Before welding sheet 330 in place an insulation sheet or liner 332 is positioned around the walls and the base of the container and then the liner 320 is welded in place to hold this highly effective insulation liner in place. The welding technique shown applied at 322 and 328 is selected from many available techniques and compatibility between the protected liner 324 and 330 and the formed material and the container and cover is merely a matter of selection. An alternate means of supplying additional insulation is by spraying the insulation onto the desired areas.

PLAN VIEW OF COVER AS SEEN IN FIG. 17A

Figure 17A:
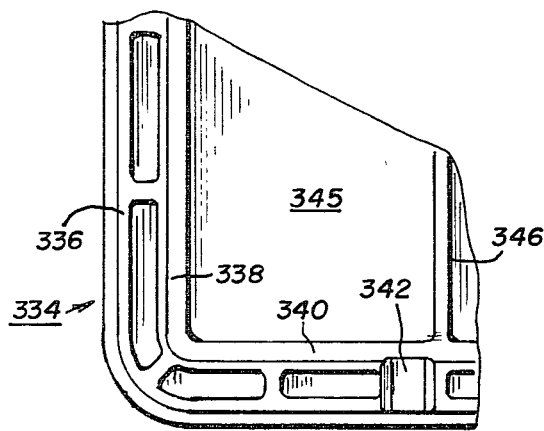
FIG. 17A represents a fragmentary plan view of a corner of the cover of FIG. 16A.

Referring next to FIG. 17A, there is shown a plan view looking down on the corner of the cover of FIG. 16. In this view the rim portion 334, which may be about one and one-quarter inches (31.75 mm.) wide, is formed with inner and outer ribs 336 and 338. These rib portions may extend upwardly about three-eighths inch (9.53 mm.) from a top surface 340. This rib portion has a rounded corner portion and is reinforced at intermediate portions therealong to stiffen the upstanding rib portions. Also seen in this view and in other views is a groove or slot 342 which is provided to accommodate a plastic or metal strap for application where the lid (cover) needs extra security.

SIDE VIEW OF THE COVER AS IN FIG. 17B

Figure 17C:
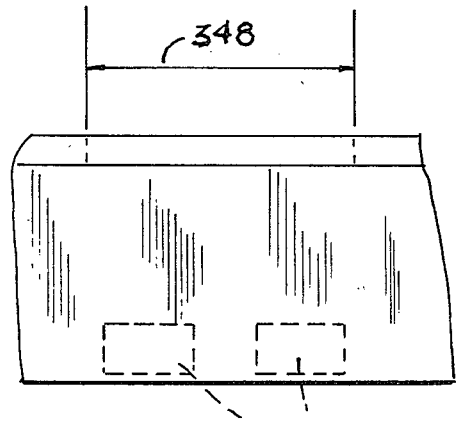
FIG. 17C represents a fragmentary side view of a mid-side portion of the cover of FIG. 17A and showing a typical pair of retaining latches, with two latches being formed on each end and side walls of the cover.
Figure 17B:
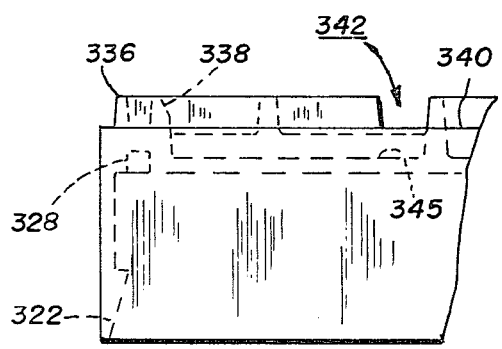
FIG. 17B represents a fragmentary side view of the cover of FIG. 17A.

Referring now to the side view of the cover as shown in FIG. 17B, it is to be noted that top support surface 340 extends around the cover to provide a means for supporting the above container, as seen in FIG. 16A. A cover portion 345 extends between the upstanding rib portions 346 which are formed in a grid pattern to reinforce and stiffen the cover which is as large as the container. The O-ring seal groove 328 is shown in dotted outline as is the latch 322. The height of the cover is made to suit the latching and the seating arrangement of the container which is to be used with this cover.

LATCH MEMBERS AS IN FIG. 17C

Referring now to FIG. 17C, there is shown a side view looking from the outside of the cover and showing in dashed outline a protrusion part forming latch members for the cover. Preferably as a contemplated portion of a cover there is formed on each of the four depending sides of the cover a pair of latch protrusions 322. These latch protrusions are preferably matched pairs on each of the four depending sides of a cover. As seen, these latches are approximately one and one-half inches (38.1 mm.) wide and the top of the cover has cutouts in the outer portion of the web or rim in order to admit shut-offs therethrough. These shutoffs enable latch portions 322 to be made integral and on the inside of the cover. These latch portions are shown in the dotted outline.

An outside showing of the extending shutoff is indicated by the dimension 348.

COVER AND PALLET-CONTAINER CONSTRUCTION ACCORDING TO FIG. 18A

Figure 18:
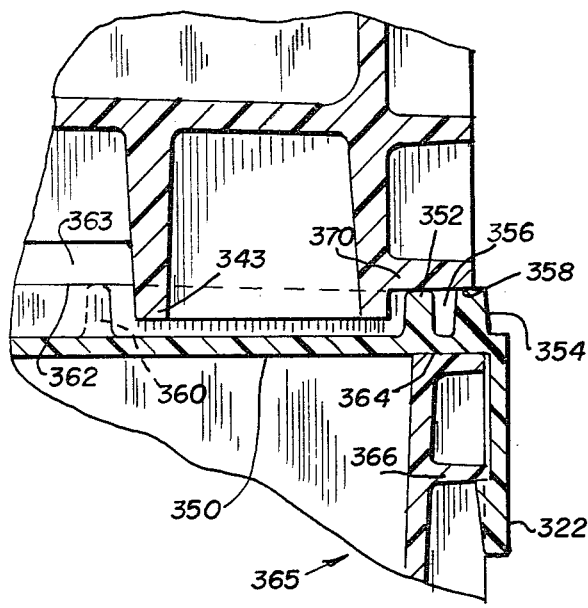
FIG. 18A represents a partly fragmentary and diagrammatic side view of an alternate embodiment of a cover and pallet-container and showing a shallow cover and alternate stacking and retaining configuration.
FIG. 18B represents the construction of the pallet-container of FIG. 18A and showing the bottom with a convex configuration.
FIG. 18C represents a plan view looking upwardly of the corner bottom of the pallet-container of FIG. 18B.
Figure 18:
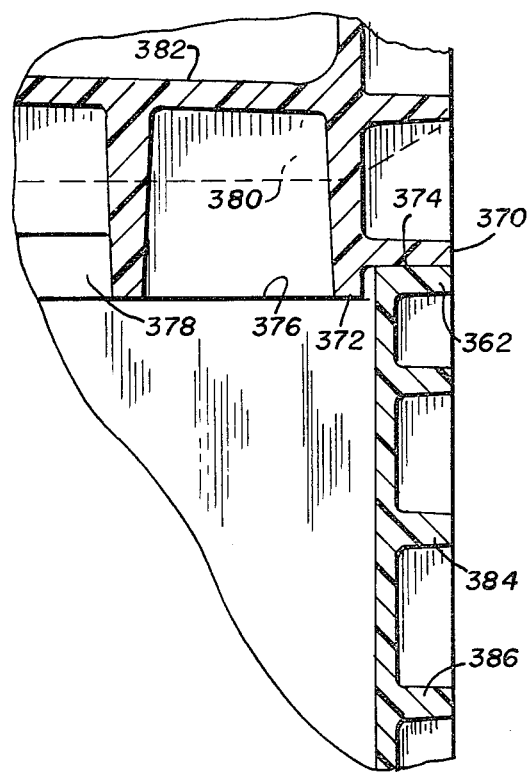

In FIG. 18A is shown a pallet-container and cover in which the cover is made with a very low profile and the container bottom is made with very shallow entrances for the forks of the fork truck on the side portions of the pallet-container. This pallet-container is made for storage in aircraft where space is at a premium and where the strength or stiffness is a more desired quality. As exemplified, a cover 350 has a rim portion including two ribs 352 and 354 which act as guide shoulders when the covers are stacked alone by themselves. An inner rib 360 is also formed as a part of the cover and provides a top surface 362 for the support of an inner, central rib 363 as provided by a bottom portion of the pallet-container. The pallet-container which is adapted to sit on this cover is more fully seen in FIG. 18B. As seen, the top surface 364 (FIG. 18A) of a pallet-container 365 has rib portion 366 which is engaged by the latch members 322, above-identified. An outermost flange and leg portion 370 of the pallet-container 365 is adapted to be formed so as to be seated and supported by the ribs 352 and 354 on the support surface 358. An interior leg portion 372 (FIG. 18B) is adapted to engage the shoulder 352 (FIG. 18A) of the cover and the inner wall portion of the pallet-container 365 which provides a nest or shoulder for the pallet-container. A fuller description of the bottom portion of the pallet construction is in conjunction with FIG. 18B.

CONVEX, BOTTOM PALLET-CONTAINER CONSTRUCTION AS SHOWN IN FIG. 18B

Referring now to FIG. 18B, it is to be noted that the top surface 362 of the outwardly facing flange portion 370 of the pallet is adapted to seat upon surface 374. The leg portion 372 extends downwardly to a surface 376 which, except for the openings for the forks of the fork lift truck, is adapted to engage and support the pallet-container when it is placed upon a floor or a roller conveyor, not shown. A low opening 378 is provided at four places in the bottom portion of the pallet and provides entryways for forks on two opposite sides of the pallet. This is usually the long sides as the shorter ends are made to easily ride on a roller conveyor. This opening is only about one inch (25.4 mm.) or so and provides an entryway for only the thin portions of the forks. The opposite side of the pallet is abutted by other apparatus in order to prevent the pallet-container from sliding away from the forks when they are pushed underneath the pallet-container. A bottom portion 382 of the pallet-container slopes upwardly from a side to a height which may be approximately one-half to one inch (12.7 mm. to 25.4 mm.) from the extreme sides of the side portions to the center of the pallet-container. It is also to be noted that horizontal ribs 384 and 386 extending from the upper portion of the container side wall are also made thicker to provide greater side resistance or stiffness for the upper portion of the pallet-container depicted. These thicker ribs make the top portion of the pallet-container very stiff and adapted to carry the load of an above pallet or pallets.

BOTTOM VIEW OF PALLET-CONTAINER OF FIG. 18C

Figure 18C:
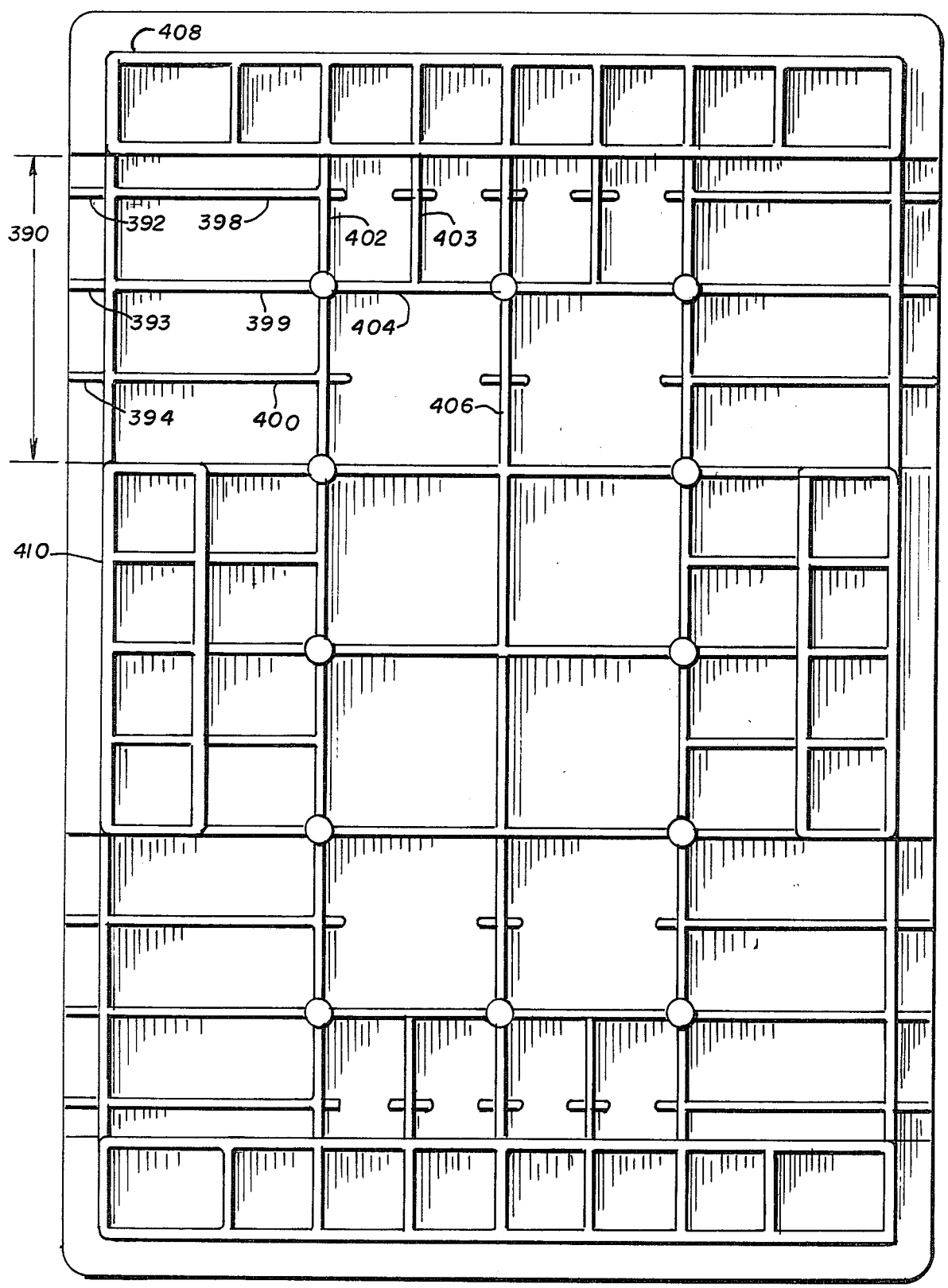

In FIG. 18C is shown a bottom view of a pallet-container having only side entries for the forks of a lift truck. This pallet-container has a convex bottom. Entryway 390 is typical with rib portions 392, 393 and 394 tapered to assist in guiding and sliding the fork ends of the fork lift truck as they approach and pass and slide underneath rib 396. Ribs 398, 399 and 400 are all the same height and provide a support surface for the entering fork of the fork lift truck. Ribs 402, 403 and 404 and the center rib 406 are at the entry height of the fork end ribs 398, 399 and 400. The end support 408 and the side supports 410 extend to the ground level or a floor level to provide a support surface upon which the pallet-container rests upon the floor of a roller conveyor.

INSULATION AS PROVIDED IN THE CONVEX PALLET BOX AND COVER OF FIG. 19

Figure 19:
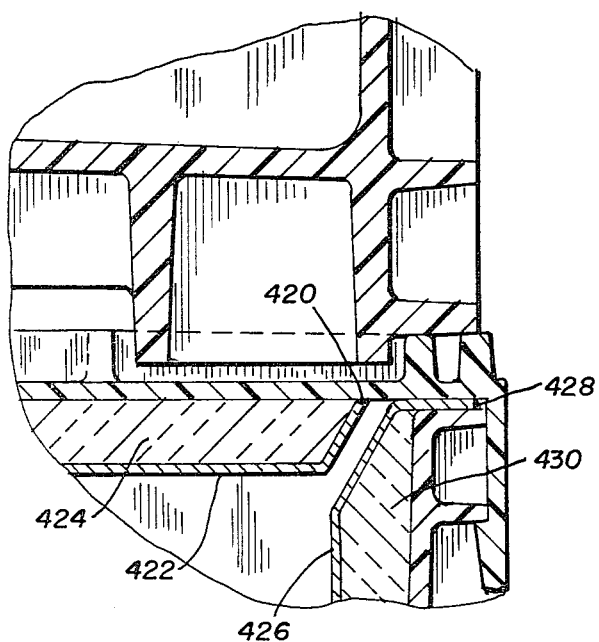
FIG. 19 represents a fragmentary side view of the pallet-container and cover of FIG. 18A and with an inner member secured to the cover and to the container interior wall to retain additional insulation as in FIG. 16B.

As seen in FIG. 19, the pallet-container and the cover of FIG. 18A has an additional insulation provided in the manner of FIG. 16B. As depicted, the cover has a weld 420 by which the formed liner 422 is secured to the cover. An insulation sheet 424 is placed in position before the welding of the member 422 to the cover is made. In the same manner, a formed sheet 426 which may rest upon the top of the container rim and be attached to the rim by a weld 428 secures and protects this sheet on insulation liner 430 which is maintained in position by the formed member 426 and is placed in position before the weld 428 is achieved.

It is to be noted that the top flange of the pallet-container and the bottom support surface of the same container must be similarly formed to provide a support for an above pallet-container. Sloped surfaces or other configurations may be provided, but a plug fit of one container on another is desired. A cover may be placed on a container and provide a seating surface for an above container. The plug fit is sufficiently loose to enable free lift and placement.

The convex configuration for the pallet-container bottom is conventionally about one inch (25.4 mm.) higher at the middle than the side but a lesser or greater height may be provided. This convex construction insures that greater load can be placed in the pallet-container without a large downward bowing of the bottom.

The additional insulation may be a molded sheet, loose pallets or any other material. The outer sheet is to provide retention plus preventing damage to this additional insulation. The method of attaching this formed sheet to the pallet-container and cover depends upon the materials involved.

The above disclosure shows several arrangements of a cover and pallet-container. The actual molding of either and all members is in conventional equipment. The physical size and method for ejecting the pallet-container is novel and includes moving of the four sides of the mold away from the pallet-container before drawing the force to an eject position. Structural plastic foam is produced in both thermoplastic and thermosetting materials. The pallet-container, above-described, is contemplated to be made of such material in order to utilize the lighter weight of foam with the stiffness of such material.

As a method of forming a one-piece pallet-container, the physical structure of the unit must be considered. The method to be hereinafter claimed is, therefore, drawn in language as approved by the CCPA Decision in re KUEHL 177 USPQ Page 251.

Terms such as "left", "right", "up", "down", "bottom", "top" "front", "back", "in", "out" and the like are applicable to the embodiments shown and described in conjunction with the drawings. These terms are merely for the purpose of description and do not necessarily apply to the position in which the pallet-container may be constructed or used.

While particular embodiments of this pallet-container have been shown and described it is to be understood the invention is not limited thereto since modifications may be made within the scope of the accompanying claims and protection is sought to the broadest extent the prior art allows.

What is claimed is:

1. A one-piece rectangular pallet-container of foamed plastic and having like sides and like ends molded in a unitary manner to a bottom member and providing an open top, this pallet-container having means for the guiding thereunder and lifting thereof by the forks of a lift truck including: (a) a bottom member having downwardly extending ribs forming both a reinforcement and support surface for a pair of forks of a lift truck, this bottom member being formed to provide a plurality of entrances for said forks and with those ribs extending downwardly from the bottom member and transverse to an opening for the entry of a fork end of a fork lift having rib portions extending transversely thereof, these transversely disposed ribs being sloped to provide a guide ramp to direct the entering fork end to and past the transverse ribs; (b) a pair of end members having both horizontal and vertical ribs in a generally arranged waffle pattern, the ribs extending from the side walls in a generally parallel pattern and from said open top to the bottom member; (c) a pair of side members having both horizontal and vertical ribs arranged in a generally waffle pattern, these ribs extending from the side walls in a generally parallel pattern from said open top to the bottom member; (d) a formed top disposed around the open upper portion of the pallet-container and providing a shoulder along the sides and ends of the pallet-container; (e) leg portions provided at the four corners of the bottom member, these legs establishing a support plane of the bottom which is sufficiently distant from the bottom of the container for the entrance at a plurality of openings between the legs and intermediate supports for the free entry of a lift truck, and (f) a formed plug-shoulder formed on the bottom of the corner leg portions and the intermediate supports, this plug shoulder adapted to seat in and position said pallet-container in a formed open top of and on an immediately below pallet-container.

* * * * *